United States Patent
Greubel

(10) Patent No.: US 9,815,153 B2
(45) Date of Patent: Nov. 14, 2017

(54) PROCESS FOR PRODUCING A THREADED SPINDLE HAVING A LARGE BEARING SEAT

(75) Inventor: Roland Greubel, Ramsthal (DE)

(73) Assignee: Robert Bosch GmbH, Stuttgart (DE)

( * ) Notice: Subject to any disclaimer, the term of this patent is extended or adjusted under 35 U.S.C. 154(b) by 1217 days.

(21) Appl. No.: 13/306,125

(22) Filed: Nov. 29, 2011

(65) Prior Publication Data

US 2012/0138199 A1    Jun. 7, 2012

(30) Foreign Application Priority Data

Dec. 1, 2010  (DE) ..................... 10 2010 053 119

(51) Int. Cl.

| | |
|---|---|
| *B21J 5/08* | (2006.01) |
| *B23P 15/00* | (2006.01) |
| *B21J 9/08* | (2006.01) |
| *B21K 1/12* | (2006.01) |
| *C21D 8/00* | (2006.01) |
| *C21D 9/00* | (2006.01) |

(52) U.S. Cl.
CPC ............... *B23P 15/00* (2013.01); *B21J 5/08* (2013.01); *B21J 9/08* (2013.01); *B21K 1/12* (2013.01); *C21D 8/00* (2013.01); *C21D 9/00* (2013.01)

(58) Field of Classification Search
CPC ..................................... C21D 9/00; B21J 5/08
See application file for complete search history.

(56) References Cited

U.S. PATENT DOCUMENTS

| | | | | |
|---|---|---|---|---|
| 3,198,926 | A | * | 8/1965 | Melmoth ....................... 219/602 |
| 3,711,338 | A | * | 1/1973 | Vitelli ............................. 148/598 |
| 3,842,644 | A | * | 10/1974 | Biesmans .................... 72/342.1 |
| 5,199,169 | A | | 4/1993 | Bonzak |

FOREIGN PATENT DOCUMENTS

| | | |
|---|---|---|
| DE | 28 52 179 A1 | 12/1980 |
| DE | 102 06 744 A1 | 9/2002 |
| EP | 0 157 894 A1 | 10/1985 |
| EP | 1 046 440 A1 | 10/2000 |
| EP | 1046440 A1 * | 10/2000 |
| JP | 60-009543 A | 1/1985 |
| JP | 60-238056 A | 11/1985 |
| JP | 60-238059 A | 11/1985 |
| JP | 2000-237837 A | 9/2000 |

OTHER PUBLICATIONS

English machine translation of EP 1046440 A1 of Huwiler et al. (Oct. 2000).*

* cited by examiner

*Primary Examiner* — Roy King
*Assistant Examiner* — Jophy S Koshy
(74) *Attorney, Agent, or Firm* — Maginot, Moore & Beck LLP

(57) ABSTRACT

A process for producing a bearing seat or a drive journal having a large diameter on a rolled threaded spindle is disclosed. The blank of the threaded spindle is hot-upset in the longitudinal direction, such that it bulges radially with respect to the longitudinal direction, a first longitudinal region having an enlarged diameter being provided.

13 Claims, 2 Drawing Sheets

PROCESS FOR PRODUCING A THREADED SPINDLE HAVING A LARGE BEARING SEAT

This application claims priority under 35 U.S.C. §119 to patent application no. DE 10 2010 053 119.7, filed on Dec. 1, 2010 in Germany, the disclosure of which is incorporated herein by reference in its entirety.

BACKGROUND

The disclosure relates to a process for producing a threaded spindle.

It is known from DE 102 06 744 B4 to produce a threaded spindle using a thread rolling process. In this case, a blank which extends in a longitudinal direction is provided with at least one helical groove on its outer circumferential surface substantially over its entire length, in which groove the balls of a ball screw drive run, for example. After the thread rolling operation, the blanks are typically subjected to material-removing machining, in order to produce bearing seats for radial rolling bearings or drive journals for the connection of electric motors or gear mechanisms at the ends.

The diameter of said bearing seats and drive journals is upwardly limited by the core diameter of the helical groove. It may be the case here that the thus achievable diameter of the radial rolling bearings or of the drive journals is not sufficient for permanently transferring the loads which arise during operation. To solve this problem, it is known from U.S. Pat. No. 5,199,169 A to adhesively bond a special sleeve to the helical groove of the blank. Said sleeve can be designed to have a diameter of any desired size, and therefore the problem relating to load-bearing capacity as discussed above no longer exists. Since the length of the adhesive bond can be chosen to have any desired magnitude, it is also ensured that the adhesive bond has a sufficiently high load-bearing capacity. As an alternative to said adhesive bonding, it is also known to fasten a special component to the rolled spindle blank by means of friction welding.

The object of the disclosure is to provide a more cost-effective process in order to provide in particular rolled threaded spindles having a large bearing seat or a large drive journal or the like.

SUMMARY

This object is achieved by the process set forth below. Features of the disclosure are based on the concept of increasing the diameter of the blank by plastic deformation in the region of the bearing seat or of the drive journal, and then bringing the blank to the desired end form by material-removing machining. It is therefore no longer necessary to provide a special component for the bearing seat or the drive journal, and therefore the production costs for the threaded spindle are reduced.

With respect to said plastic deformation, it should be borne in mind that the helical groove, which has a high degree of precision in particular in the case of ball screw drives, is not plastically deformed. This exploits the fact that steel is considerably more readily deformable at high temperatures than at ambient temperature. This is intended in particular for forging temperatures in the order of magnitude of about 1100° C., at which just about no layer of scale or oxide forms on the steel surface. Said temperature in this case forms the maximum temperature which should not be exceeded, in particular on the surface of the blank. It is clear that the blank cannot be heated uniformly to this temperature in the entire first longitudinal region, in particular not in the transition region to the unheated longitudinal regions of the blank.

With the aid of the first and of the second stop, the length of the blank is shortened, such that the latter inevitably bulges in the heated, first longitudinal region, resulting in the desired increase in diameter. As a result of the heating operation, the longitudinal force required for the deformation in the first longitudinal region is reduced to such an extent that it is no longer sufficient for plastically deforming the longitudinal regions of the blank which are at ambient temperature. The latter longitudinal regions are therefore either not deformed at all or are deformed only elastically during the upsetting operation, and therefore the deformation thereof is fully reversible and the precision of the helical groove therein is not impaired.

Advantageous developments and improvements are set forth below.

The first longitudinal region can be arranged at a distance from the first and the second stop. This is intended to have the effect that, in the region of the first and of the second stop, the blank is at a temperature which lies considerably below the maximum temperature of the blank, and ideally at ambient temperature. Therefore, the blank is substantially not plastically deformed in the region of the first and of the second stop. As a result, it is impossible for the blank to become clamped together with the first or the second stop in a form fit, such that these parts can no longer be detached from one another.

In addition, the plastic bulging according to the disclosure in the first longitudinal region is not hindered by the fixed stops. The form of the blank after the deformation operation is therefore dependent only on the temperature distribution after the heating operation and the change in distance between the first and the second stop. These process parameters can be changed continuously with little outlay, and therefore the desired increased diameter of the spindle can be set continuously.

The first longitudinal region of the blank can be heated inductively with an alternating current, which is guided annularly around the blank. The inductive heating of the blank therefore takes up only a very short period of time, and this largely prevents heat from flowing into the longitudinal regions of the blank which are not to be plastically deformed. In addition, by virtue of the form of the electrical conductors which carry said alternating current, it is possible to establish with great accuracy where the heating operation should take place.

It is preferable for the alternating current to have a frequency of between 5 kHz and 50 kHz. At the upper limit value, it is possible to achieve very quick heating of the blank, in which case a sufficiently high temperature cannot be achieved in the core of the blank as its diameter increases. In this case, it may be appropriate to lower the frequency to the lower limit value. Said alternating current is preferably carried in a copper wire, which runs helically with respect to the longitudinal direction and is at a sufficiently large distance from the blank such as to be reliably prevented from making contact therewith. The helical copper wire is usually referred to as an inductor.

The blank can rotate with respect to the longitudinal direction during the heating operation. This has the effect that the temperature distribution is rotationally symmetrical with respect to the longitudinal direction. As a result, the bulging according to the disclosure is also rotationally symmetrical. Since the end form produced by material-removing machining is likewise rotationally symmetrical in the vast majority of cases, unnecessary waste is thereby avoided. The plastic increase in diameter can remain restricted to the lowest required extent.

The blank can be cooled upstream and/or downstream of the first longitudinal region in the longitudinal direction during the heating operation and/or the deformation operation by being sprayed with a cooling fluid. The helical groove of the blank is preferably hardened so that it has a high resistance to wear during operation of the screw drive. The heating according to the disclosure carries the risk that this hardness will be lost at least in the vicinity of the first longitudinal region. The proposed cooling avoids heating of the steel to above the tempering temperature, and therefore the hardness is retained. Furthermore, the transition region, in which the blank is no longer at the full forging temperature, is reduced. In this region, which is likewise plastically deformed, the helical groove is no longer usable for the screw drive. At the same time, the deformation is not enough for the increase in diameter to suffice for the production of the bearing seat or of the drive journal. The transition region therefore only increases the overall length of the later screw drive, without this being associated with any advantage.

The cooling fluid is preferably water, a water mixed polymer solution or oil. However, it is also conceivable to spray $CO_2$ or other fluids which are gaseous at ambient temperature onto the blank. In this case, these gases can be cooled to such an extent that they are liquid and evaporate during the cooling operation. This makes it possible to achieve a particularly high cooling action.

The blank can be rotationally fixed with respect to the longitudinal direction during the relative movement of the first and of the second stop. As a result, only the longitudinal movement of the first and of the second stop acts on the blank. Undesirable deformations as a result of other movements of the blank are thereby avoided.

A remnant of the helical groove can remain in the first longitudinal region after the material-removing machining. The required increase in diameter and therefore the required deformation force can thus be limited to a minimum. In this respect, it should be noted that the maximum deformation force is limited by the elasticity limit of the material of the blank at ambient temperature. The remaining remnant of the helical groove is generally not damaging to the bearing seat or the drive journal, since it otherwise has a sufficiently large bearing surface.

The blank can be subjected to an annealing treatment in the first longitudinal region before the operation of cooling to ambient temperature by being heated to a temperature of 750° C. to 800° C. for a period of time of 1 s to 10 s. This has the intention of establishing a material microstructure in the first longitudinal region which makes simple material-removing machining possible. At the same time, the intention is to prevent the threaded spindle from breaking on account of excessively hard areas. In this respect, it should be noted that the threaded spindle preferably consists of a hardenable steel. This can become hard at least in certain regions during the deformation process according to the disclosure.

The blank can rotate with respect to the longitudinal direction during the annealing treatment. Rotationally symmetrical through-heating of the blank is achieved as a result, and therefore the targeted material microstructure likewise has a rotationally symmetrical form. Imperfections are thus avoided.

The annealing treatment can be carried out using the same apparatus as that which was used to previously heat the blank. The costs for carrying out the process according to the disclosure are thereby minimized. In particular, an inductively operating heating apparatus is readily suitable for producing both temperatures. For this purpose, it suffices to appropriately set the strength or the frequency of the alternating current which flows through the inductor.

It is possible for a plurality of processes according to the disclosure to be carried out in succession on the same blank, wherein the corresponding first longitudinal regions are arranged so as to be directly adjacent in the longitudinal direction. This is intended to increase the diameter of the blank over a particularly long region. When the process according to the disclosure is used once, this gives rise to a certain ratio of increase in diameter and length of the first longitudinal region which can be set only in certain limits. By virtue of the proposed process, it is possible to avoid an unnecessarily high increase in the diameter of the blank and therefore excessively large deformation forces. In this respect, it should be noted that the maximum deformation force is limited by the elasticity limit of the cold material of the blank. The material-removing machining to the end form is preferably carried out once at the end of the overall process.

BRIEF DESCRIPTION OF THE DRAWINGS

Features of the disclosure are explained in more detail hereinbelow with reference to the appended drawings.

DETAILED DESCRIPTION

Figure 1:
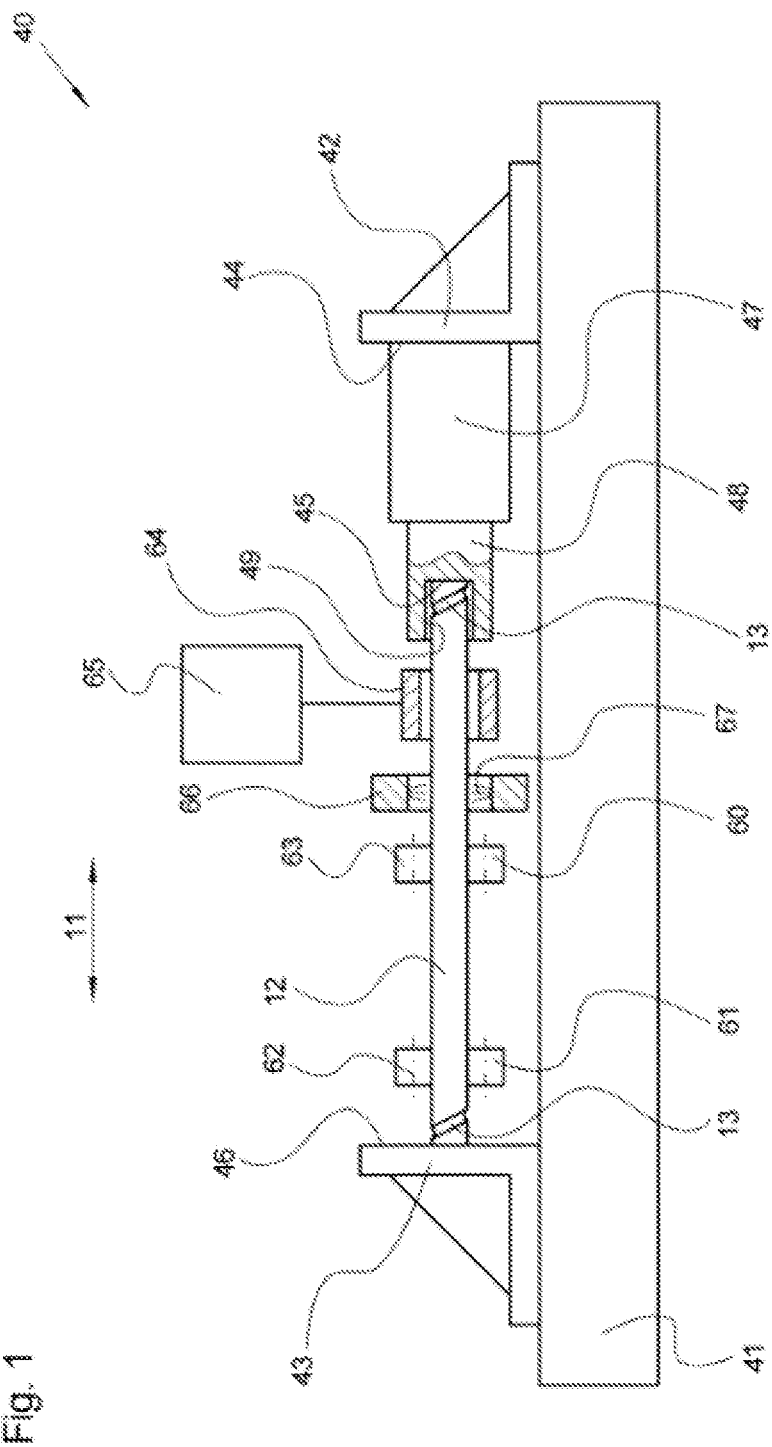
FIG. 1 shows a roughly schematic side view of an apparatus for carrying out the process according to the disclosure.

FIG. 1 shows a roughly schematic side view of an apparatus 40 for carrying out the process according to the disclosure. The apparatus 40 comprises a solid base frame 41, which extends parallel to the longitudinal direction 11 of the blank 12. A first and a second, identical angled stop 42; 43 are fastened to the base frame 41 such that they can be adjusted in the longitudinal direction 11, and therefore the apparatus 40 can be adapted to different lengths of the blank 12. The planar stop surfaces 44 of the angled stops 42; 43 are oriented perpendicularly to the longitudinal direction 11 and point toward one another. A hydraulic cylinder 47, the piston rod 48 of which can be moved in the longitudinal direction 11, is fastened to the stop surface 44 of the first angled stop 42. Instead of the hydraulic cylinder 47, it is also possible for a mechanical drive, in particular an electric cylinder, to be provided, equipped for example with a planetary screw drive or a rolling-body screw drive with a particularly high load-bearing capacity. A cylindrical receiving recess 49 is provided at the front end of the piston rod 48. The blank 12 bears by way of an end face against the planar bottom surface of the receiving recess 49, such that said bottom surface forms the first stop 45. The diameter of the receiving recess 49 is formed slightly larger than the outer diameter of the blank 12, and therefore the latter can rotate freely in the receiving recess, to be precise even when the plastic deformation according to the disclosure has been completed.

The blank 12 bears by way of its opposite end face against the stop surface 44 of the second angled stop 43, such that said stop surface forms the second stop 46. By extending the piston rod 48, it is therefore possible to shorten the distance between the first and the second stop 45; 46 in the longitudinal direction 11. As an alternative to the envisaged stops 45; 46, which engage against the end faces of the blank 12, it is also possible to provide stops which engage into the helical groove 13 of the blank 12.

The blank 12 is supported transversely to the longitudinal direction via a first and a second group of supporting rollers 60; 61, it being possible for less or more than two groups of supporting rollers to be provided depending on the overall length of the blank. Each group of supporting rollers 60; 61 in this case comprises three rotatable rollers, which are arranged at the same longitudinal position distributed uniformly over the circumference of the blank 12. At least one of the supporting rollers of the first group 60 is in the form of a driven supporting roller 63, such that the blank 12 can be made to rotate with respect to the longitudinal direction 11. The remaining supporting rollers are freely rotatable, the axis of rotation 62 thereof running parallel to the longitudinal direction.

The inductor 64 is arranged between the first group of supporting rollers 60 and the first stop 45. The inductor 64 consists of a copper wire which has a diameter of about 5 mm and runs helically around the blank 12, without making contact with it, the ends of said wire being connected to an alternating current source 65, the alternating current frequency of which can be adjusted between 5 kHz and 50 kHz, and the arrangement of alternating current source 65 and inductor 64 being movable in the longitudinal direction 11. As a result of this, the inductor 64 can heat any desired point of the blank. If the inductor 64 is moved during the heating operation, the length of the first longitudinal region (FIG. 2; no. 14) in which the heating operation is to take place can be greater than the width of the inductor 64. In addition, the inductor 64 can be moved out of the first longitudinal region after the heating operation, such that the inductor does not disrupt the bulging of the first longitudinal region. As an alternative to this, the inductor 64 can be formed with a diameter which is sufficient so as not to make contact with the bulging blank 12.

An annular sprinkler 66 is arranged between the inductor 64 and the first group of supporting rollers 60. The annular sprinkler 66 is fixedly connected to the assembly consisting of the inductor 64 and the alternating current source 65, such that it can be moved together with the inductor 64 in the longitudinal direction 11, in which case the distance between the annular sprinkler 66 and the inductor 64 is predefined fixedly during the operation for heating the blank 12. The annular sprinkler 66 bounds a hollow space which is in circular ring form and surrounds the blank 12. A multiplicity of nozzles are provided on the inner side of the annular sprinkler 66, which faces toward the blank 12, arranged distributed uniformly over the circumference of the annular sprinkler 66. The cooling fluid 67, for example water, is fed to said annular hollow space under pressure and sprays via said nozzles onto the blank 12, so that the latter is cooled.

Before the blank 12 is inserted into the apparatus 40, the hydraulic cylinder 47 is retracted and the inductor 64 together with the annular sprinkler 66 is moved into the end position facing toward the hydraulic cylinder 47. Furthermore, the second angled stop 43 is moved in the longitudinal direction 11 to such an extent that the blank 12 can be inserted through the annular sprinkler 66 and the inductor 64 into the receiving recess 49 of the hydraulic cylinder 47. After the blank 12 has been inserted, the supporting rollers 60; 61 and the second angled stop 43 are moved into engagement with the blank 12. Then, the inductor 64 is moved into the second longitudinal region (FIG. 2; no. 14) and charged with alternating current, such that the blank is heated to forging temperature. During the heating operation, the blank 12 is made to rotate by the driven supporting roller 63, such that the heating operation is effected in a rotationally symmetrical manner. Furthermore, cooling water 67 is sprayed onto the blank 12 by the annular sprinkler 66 during the heating operation, such that the blank 12 is not unnecessarily heated alongside the first longitudinal region.

Figure 2:
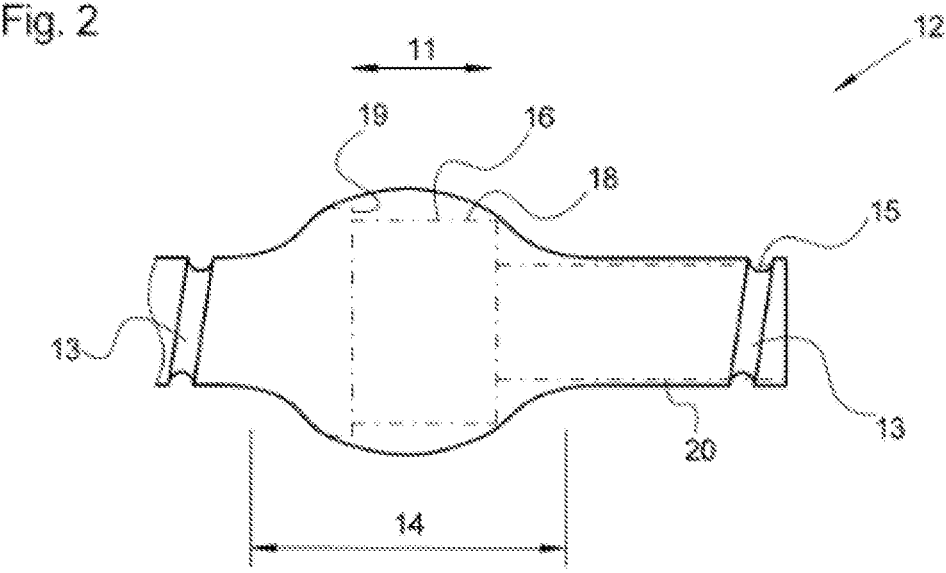
FIG. 2 shows a roughly schematic side view of the blank after the upsetting operation in the first longitudinal region.

Once the heating operation has been completed, the rotary drive of the driven supporting roller 63 is shut down. The inductor 65 remains at its longitudinal position, the annular sprinkler 66 continuing to remain active so as to cool the blank 12. Then, the hydraulic cylinder 47 is extended so that the distance between the first and the second stop 45; 46 in the longitudinal direction 11 shortens, as a result of which the blank 12 bulges in the first longitudinal region (FIG. 2; no. 14). In this case, the inductor 64 is formed with a diameter which is such that it does not make contact with the deformed blank 12. The annular sprinkler 66 is then turned off and the blank 12 is heated to an annealing temperature of 750° C. for, for example, 5 s using the inductor 64, while it is being made to rotate by the driven supporting roller 63. Then, the blank 12 is removed from the apparatus 40 and cooled to ambient temperature, such that the material-removing machining, for example on a lathe, can take place.

FIG. 2 shows a roughly schematic side view of the blank 12 after the plastic deformation in the first longitudinal region 14. The blank 12 is provided with a helical groove 13 over its entire length, only the first and the last groove turn being shown in FIG. 2, like in FIG. 1 and FIG. 3, for reasons of simplification. FIG. 2 shows the bulging form of the blank 12 after the upsetting operation. This form arises solely from the temperature distribution after the heating operation and the distance over which the first and the second stop are moved toward one another.

A thin dash-dotted line indicates the end form 16 which is produced by material-removing machining. The end form 16 comprises a bearing seat 18 having a stop edge 19 and a drive journal 20. The bearing seat 18 has a larger diameter than the blank 12, in particular in the region of the stop edge 19, in the initial state. The end form 16 lies completely within the bulging form of the blank 12. This is with the exception only of the region 15, in which a remnant of the helical groove 13 remains on the threaded spindle.

It can also be seen in FIG. 2 that the drive journal 20 has a diameter which is smaller than the diameter of the blank 12 in the initial state. This region therefore does not have to be heated and can therefore be received without any problem in the receiving recess (FIG. 1; no. 49) of the hydraulic cylinder, in order to support the blank 12 transversely to the longitudinal direction 11.

Figure 3:
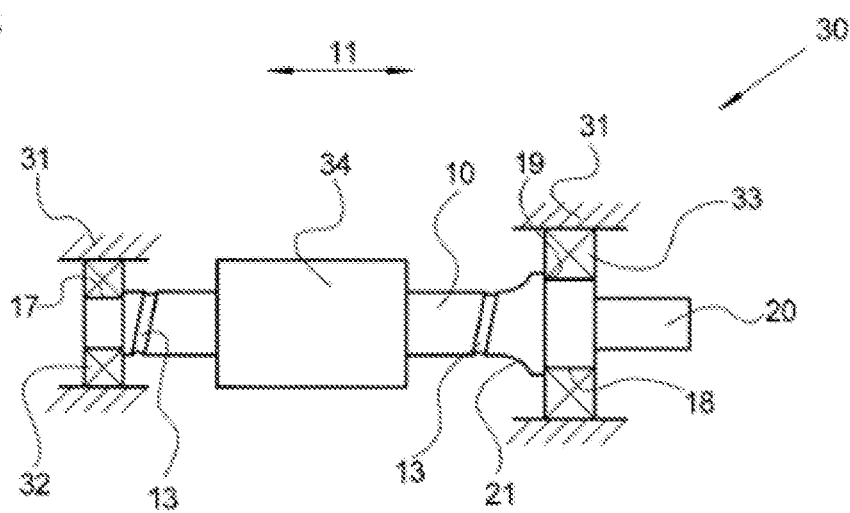
FIG. 3 shows a roughly schematic side view of a screw drive having a threaded spindle which is produced by the process according to the disclosure.

FIG. 3 shows a roughly schematic side view of a screw drive 30 having a threaded spindle 10 which is produced by the process according to the disclosure. The threaded spindle 10 is surrounded by a sleeve-like ball screw nut 34, which is in screwed engagement with the threaded spindle 10 via continuously circumferential, spherical rolling bodies. A conventionally produced, first bearing seat 17 for a first radial rolling bearing 32 is provided on the side on the left in FIG. 3. In this case, the first bearing seat 17 is worked directly into the undeformed threaded spindle 10 using a lathe.

The second bearing seat 18 according to the disclosure is provided on the opposite side, having a greater diameter than the blank in the initial state. The corresponding, second radial rolling bearing 33 can be in the form of an angular contact ball bearing, for example, so that it can transfer the longitudinal forces produced by the screw drive 30 to the superordinate assembly 31. For this purpose, the threaded spindle 10 is equipped with a stop edge 19, which has been worked into the bulging region according to the disclosure. Apart from that, the illustration of further geometries for fixing the radial rolling bearings 32; 33 in the longitudinal direction 11 has been dispensed with.

It is also necessary to point out the drive journal 20, via which the threaded spindle 10 can be moved into rotary driving connection with an electric motor or a gear mechanism by means of a coupling.

In addition, it is necessary to point out the transition region 21, which is produced by the process according to the disclosure and is usable neither for the bearing helical groove 13 nor for the second bearing seat 18.

LIST OF REFERENCE NUMERALS

10 Threaded spindle
11 Longitudinal direction
12 Blank
13 Helical groove
14 First longitudinal region
15 Region in which a remnant of the groove remains
16 End form
17 First bearing seat
18 Second bearing seat
19 Stop edge
20 Drive journal
21 Transition region
30 Screw drive
31 Superordinate assembly
32 First radial rolling bearing
33 Second radial rolling bearing
34 Ball screw nut
40 Apparatus
41 Base frame
42 First angled stop
43 Second angled stop
44 Stop surface
45 First stop
46 Second stop
47 Hydraulic cylinder
48 Piston rod
49 Receiving recess
60 First group of supporting rollers
61 Second group of supporting rollers
62 Axis of rotation of the supporting roller
63 Driven supporting roller
64 Inductor
65 Alternating current source
66 Annular sprinkler
67 Cooling fluid

What is claimed is:

1. A process for producing a threaded spindle from a steel blank, the steel blank (i) extending in a longitudinal direction, and (ii) having an outer circumferential surface that has defined therein at least one helical groove substantially over its entire length, the process comprising:
    heating a first longitudinal region of the blank, the first longitudinal region defining a portion of the at least one helical groove, the heating being conducted with the at least one helical groove having already been defined in the blank such that a force required for the plastic deformation of the blank in the first longitudinal region is reduced to below a force required for the plastic deformation of regions outside of the first longitudinal region of the blank at ambient temperature;
    clamping the blank in a longitudinally fixed manner between a first stop and a second stop;
    adjusting a relative position of the first stop with respect to the second stop in the longitudinal direction to shorten a distance between the first stop and the second stop to shorten the blank such that plastic deformation only occurs in the first longitudinal region, the plastic deformation resulting in formation of a radial bulge in the first longitudinal region;
    cooling the blank to ambient temperature; and
    subjecting the blank to material-removing machining in a region of the radial bulge formed in the first longitudinal region to form a bearing seat for the threaded spindle, the bearing seat having a stop portion and a bearing portion, the stop portion and the bearing portion each being concentric with the threaded spindle, the stop portion having a width that is greater than a width of the threaded spindle in the regions outside of the first longitudinal region,
    wherein unheated longitudinal regions of the blank which are at ambient temperature during the heating of the first longitudinal region and the forming of the radial bulge are at most deformed elastically during the forming of the radial bulge, such that portions of the helical groove in the unheated longitudinal regions are not impaired.

2. The process according to claim 1, wherein the first longitudinal region is arranged at a distance from the first stop and the second stop.

3. The process according to claim 1, wherein the heating step includes inductively heating the first longitudinal region of the blank with an alternating current, which is guided annularly around the blank.

4. The process according to claim 1, further comprising rotating the blank with respect to the longitudinal direction during the heating step.

5. The process according to claim 1, wherein the blank is cooled upstream and/or downstream of the first longitudinal region in the longitudinal direction during the heating step and/or the adjusting step by being sprayed with a cooling fluid.

6. The process according to claim 1, wherein the blank is rotationally fixed with respect to the longitudinal direction during the relative movement of the first stop and the second stop.

7. The process according to claim 1, wherein the helical groove is formed on the threaded spindle prior to the heating of the first longitudinal region of the blank, and
    wherein a remnant of the helical groove remains in the first longitudinal region after the material-removing machining.

8. The process according to claim 1, further comprising:
    subjecting the first longitudinal region of the blank to an annealing treatment that includes heating the first longitudinal region to a temperature of 750° C. to 800° C. for a period of time of 1 s to 10 s, and cooling the first longitudinal region to ambient temperature.

9. The process according to claim 8, further comprising: rotating the blank with respect to the longitudinal direction during the annealing treatment.

10. The process according to claim 9, wherein a single device is used to perform each heating step.

11. A process for producing a threaded spindle, in which process a plurality of processes according to claim 1 are carried out in succession on the same blank, wherein the corresponding first longitudinal regions are arranged so as to be directly adjacent in the longitudinal direction.

12. The process according to claim 1, further comprising:
forming the at least one helical groove in the steel blank with a thread rolling process prior to the heating of the first longitudinal region of the blank.

13. The process of claim 1, wherein cooling water is sprayed onto the blank by an annular sprinkler such that the blank is not unnecessarily heated alongside the first longitudinal region.

* * * * *